(12) United States Patent
Johnson

(10) Patent No.: US 11,602,793 B2
(45) Date of Patent: Mar. 14, 2023

(54) COMPRESSION AND TENSION FLOATING DEBURRING TOOL

(71) Applicant: The Tapmatic Corporation, Post Falls, ID (US)

(72) Inventor: Mark F Johnson, Harrison, ID (US)

(73) Assignee: The Tapmatic Corporation, Post Falls, ID (US)

( * ) Notice: Subject to any disclaimer, the term of this patent is extended or adjusted under 35 U.S.C. 154(b) by 0 days.

(21) Appl. No.: 16/997,649

(22) Filed: Aug. 19, 2020

(65) Prior Publication Data
US 2022/0055124 A1  Feb. 24, 2022

(51) Int. Cl.
*B23B 31/08* (2006.01)
*B23B 51/10* (2006.01)

(52) U.S. Cl.
CPC .......... *B23B 31/083* (2013.01); *B23B 51/101* (2013.01)

(58) Field of Classification Search
CPC ............................ B23B 31/083; B23B 51/101
See application file for complete search history.

(56) References Cited

U.S. PATENT DOCUMENTS

| | | | | |
|---|---|---|---|---|
| 3,967,830 A * | 7/1976 | Smith | ................... | B23B 31/028 279/16 |
| 3,999,642 A * | 12/1976 | Johnson | ................ | B23B 31/086 192/21 |
| 4,547,105 A * | 10/1985 | Hofle | .................... | B23B 31/083 408/141 |
| 4,722,643 A * | 2/1988 | Johnson | ................ | B23B 31/083 192/69 |
| 7,108,459 B1 * | 9/2006 | Mueller | ................. | B23B 39/00 408/1 R |
| 7,708,506 B2 * | 5/2010 | Johnson | ................ | B23B 31/083 408/238 |
| 9,296,052 B2 * | 3/2016 | Engrand | ................ | B23D 11/00 |
| 2021/0107071 A1 * | 4/2021 | Muto | .................... | B23B 51/102 |

FOREIGN PATENT DOCUMENTS

| | | | | |
|---|---|---|---|---|
| DE | 3902559 A1 * | 8/1990 | .......... | B23Q 1/0036 |
| DE | 102011122040 A1 * | 6/2013 | .......... | B23B 31/083 |
| GB | 1066486 A * | 4/1967 | .......... | B23B 31/083 |

* cited by examiner

*Primary Examiner* — Eric A. Gates
(74) *Attorney, Agent, or Firm* — Wells St. John P.S.

(57) ABSTRACT

Disclosed is a deburring tool holder that may be used in combination with a computer controlled machine with a rotating spindle allowing for the provision of biasing forces on the deburring tool in both compression and tension, including a preset or predetermined amount of biasing force independent for compression versus tension.

6 Claims, 6 Drawing Sheets

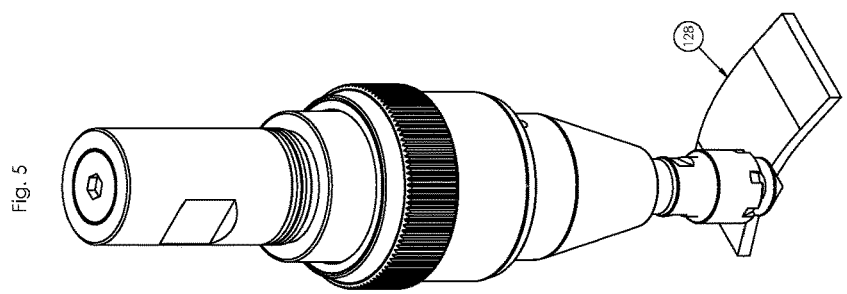
Fig. 5
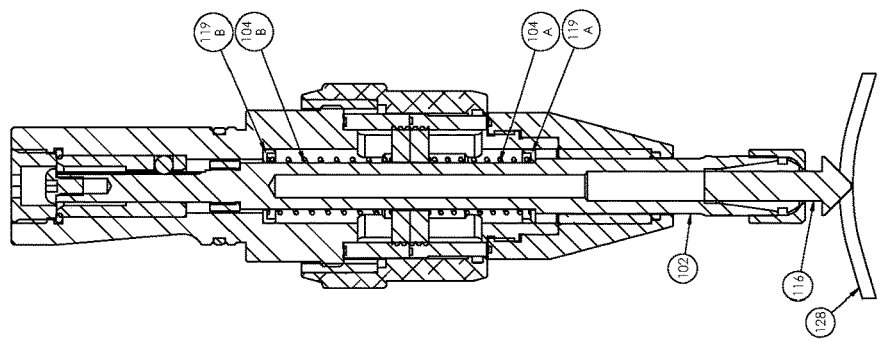
Fig. 4
Fig. 3
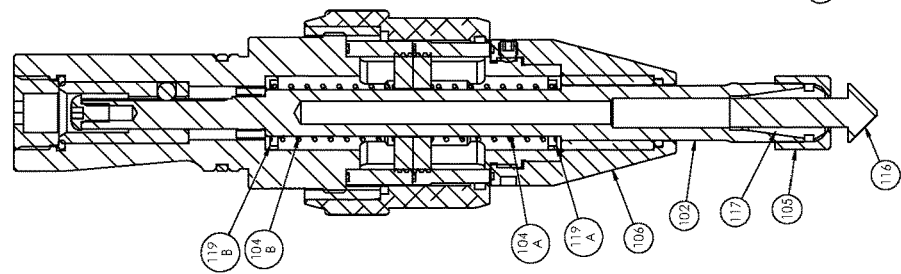
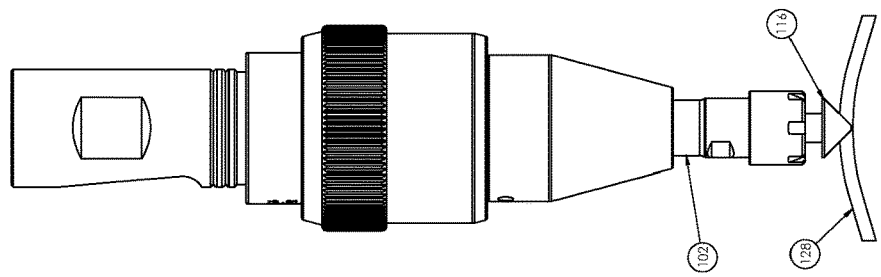
Fig. 2
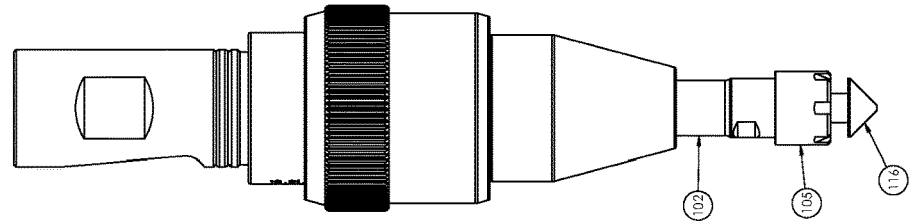
Fig. 1

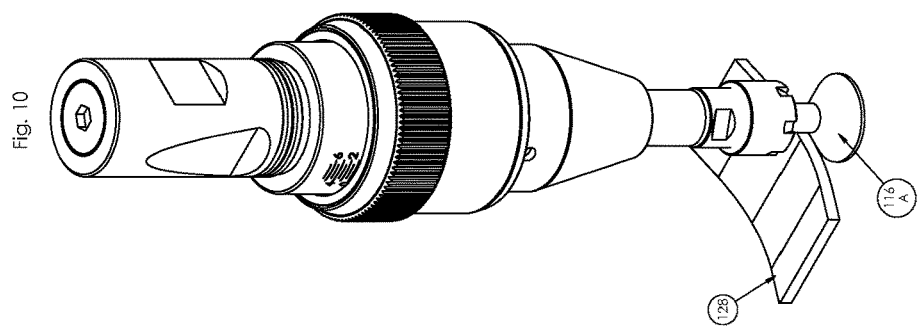
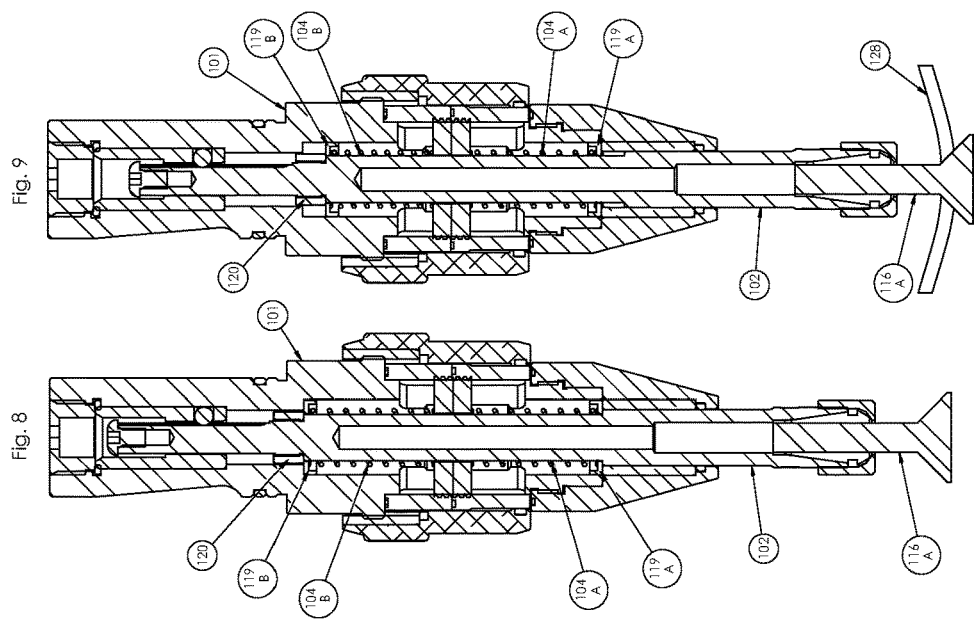
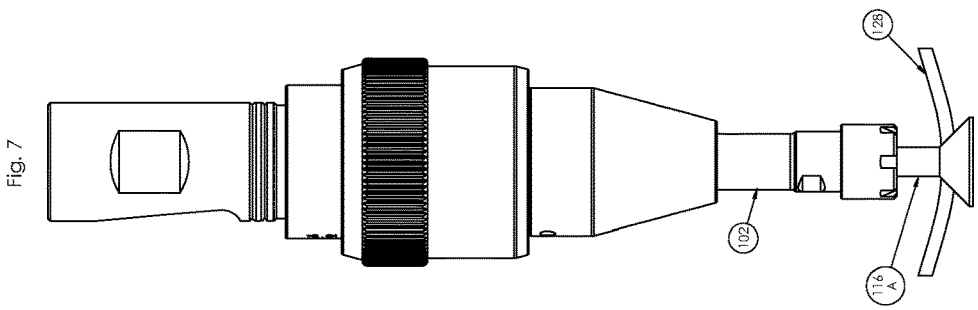
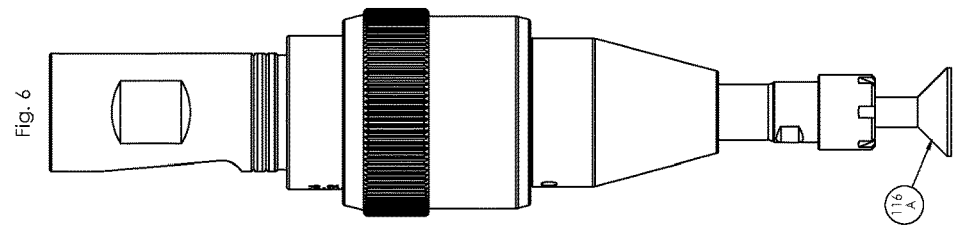

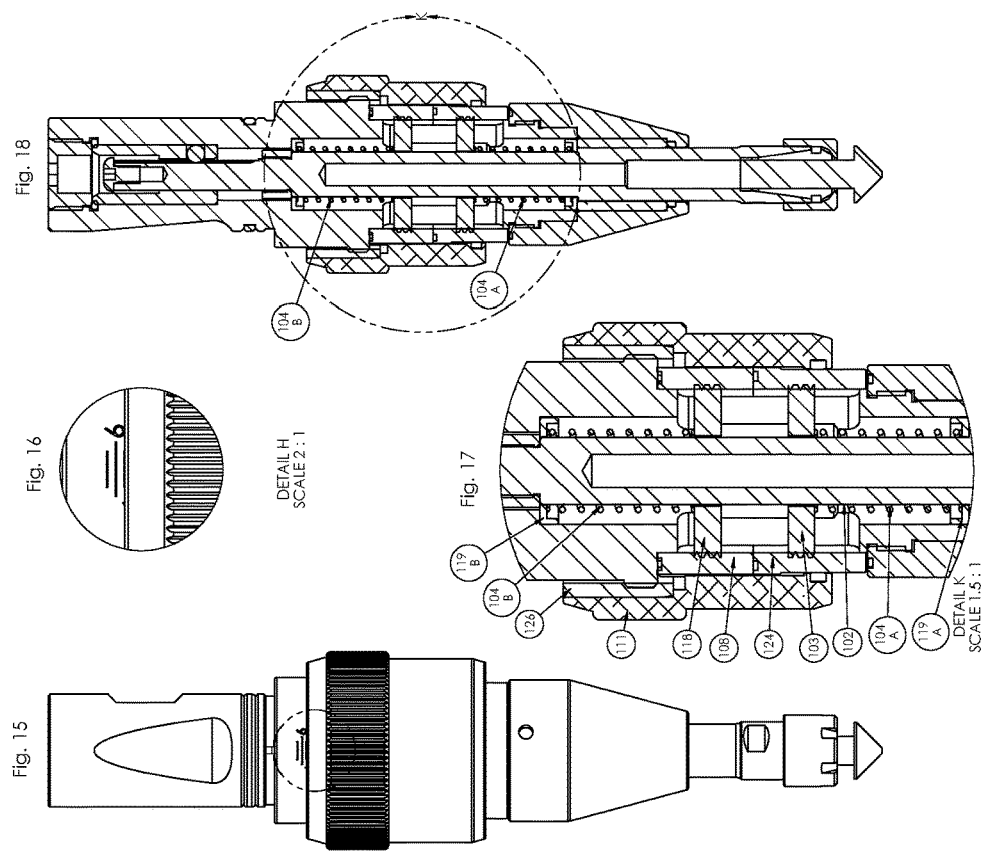
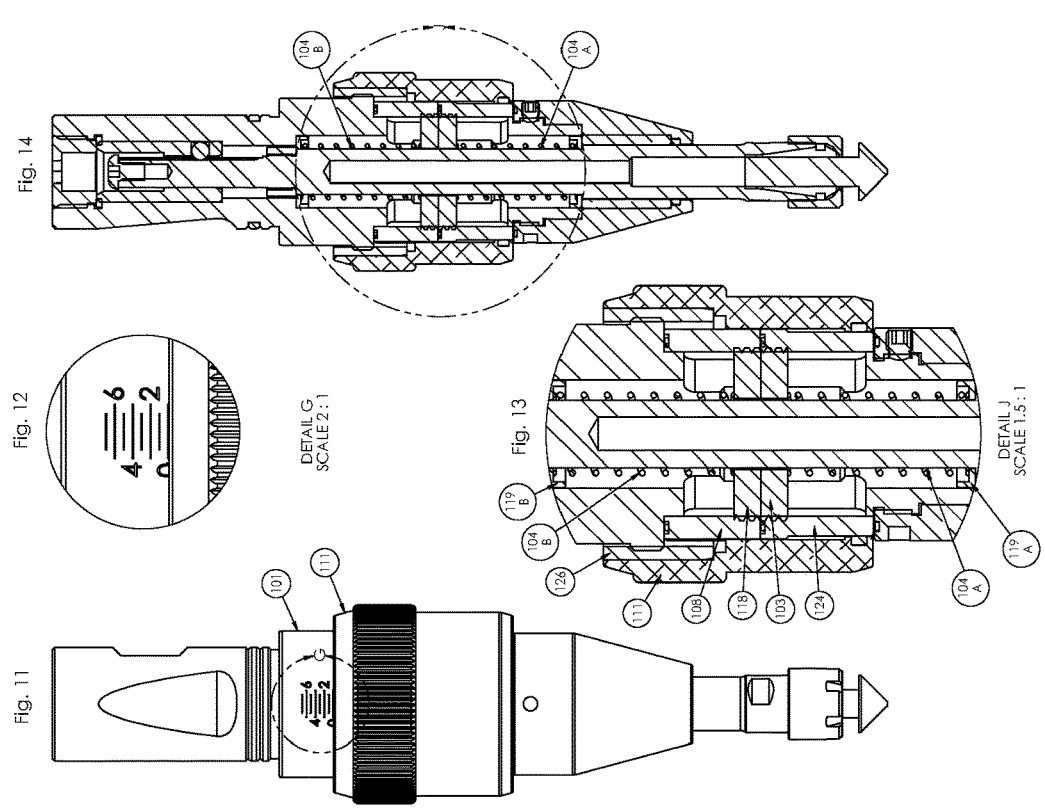

COMPRESSION AND TENSION FLOATING DEBURRING TOOL

CROSS REFERENCE TO RELATED APPLICATION

This application does not claim priority from any other application.

TECHNICAL FIELD

This invention pertains to a deburring tool holder that may be used in combination with a CNC machine that allows for the provision of biasing forces on the deburring tool in both compression and tension, including a preset or predetermined amount thereof.

BACKGROUND OF THE INVENTION

For many decades the cuts made on milled or machined workpieces have been left with protrusions, bumps, burrs and the like which are desirable to remove (on the top side, bottom or underside and the edges). The process of removing these is sometimes referred to as deburring.

Deburring work is often performed by hand but there are advantages to deburring on a CNC machine. The results can be controlled more consistently if the work is performed by the CNC machine, which may eliminate the tedious job for the operator—not to mention increasing productivity.

Ideally a deburring tool holder would need to have some margin for error such as would be provided through including some axial flexibility or float. For example, when the surfaces to be deburred are not easily defined or modeled with great precision, it makes it difficult to write a program for the CNC machine to cause the deburring tool in the deburring tool holder to follow the edge with the desired level of accuracy.

Some examples of parts where the edges to be deburred are not easily defined are castings or parts with cross holes between cavities. Holding the burr (deburring cutting tool) in a tool holder with the ability to allow for axial float means that the machine program does not have to follow the edge exactly. The deburring tool holder disclosed by this invention can compensate the flexibility to allow for these described variations (and others).

There are generally two kinds of floating holders in use today for deburring on CNC machines. One type uses angular or pendula like floating and another type uses axial or tension-compression floating. The known or existing axial floating holders are made to either work in compression only (for deburring on the top edges of a part) or tension only (for deburring edges on the underside of a part). These prior devices may employ springs or in some cases compressed air, to provide the tension or compression. The existing deburring tool holders that use springs generally are supplied with extra springs of different predetermined biasing force values rates that had to be changed out to increase or decrease the pressure applied to the part which can be helpful for different kinds of workpiece materials and/or different levels of hardness.

Another objective and advantage of this invention is that the deburring tool holder compensates or flexes axially in both the compression and tension directions (allows for deburring of the upper and lower side of the workpiece 128). The predetermined biasing force on either direction can be adjusted by increasing the preload to both the compression spring and tension spring equally, and simultaneously so there is no need to disassemble the tool to change out springs. There are two springs in the tool holder, one for compression and one for tension and the springs work independently of each other.

Besides the specifically shaped or configured burrs (such as burrs 116 and 116A) shown in the drawings, it will be appreciated by those of ordinary skill in the art that there are other shapes available. For example, there are spherically shaped burrs that can work on the top edges of a part or on the underside edges.

It is an object of some embodiments of this invention to provide a deburring tool holder wherein the tension and/or compression can be pre-set and/or adjusted to suit the application.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 1 is a front elevation view of an example of one embodiment of a deburring tool holder contemplated by this invention, illustrating a conical shaped deburring tool configured to impose a deburring force on the top and/or side of a workpiece and is shown prior to making contact with a workpiece;

FIG. 2 is a front elevation view of the embodiment of the invention illustrated in FIG. 1, only wherein the deburring tool is in contact with the workpiece, illustrating the relative movement under compression of the deburring tool;

FIG. 3 is a front elevation cross-sectional view of the embodiment of the invention illustrated in FIG. 1, and wherein the deburring tool has not yet made contact with a workpiece;

FIG. 4 is a front elevation cross-sectional view of the embodiment of the invention illustrated in FIG. 2, and wherein the deburring tool has made contact with the workpiece;

FIG. 5 is a front perspective view of the embodiment of the invention illustrated in FIGS. 1-4, and with the deburring tool in contact with the workpiece;

FIG. 6 is a front elevation view of the example of the embodiment of the invention illustrated in FIG. 1, only wherein the deburring tool being held is an inverted cone shaped and configured to deburr the underside of a workpiece;

FIG. 7 is a front elevation view of the embodiment of the invention illustrated in FIG. 6 and wherein the inverted cone shaped burr is engaged with the workpiece;

FIG. 8 is a front elevation cross-sectional view of the embodiment of the invention illustrated in FIG. 6;

FIG. 9 is a front elevation cross-sectional view of the embodiment of the invention illustrated in FIG. 7, wherein the inverted cone shaped burr is engaged with the workpiece;

FIG. 10 is a front perspective view of the embodiment of the invention illustrated in FIGS. 6-9, wherein the inverted cone shaped burr is engaged on the underside of the workpiece;

FIG. 11 is a front elevation view of the tool holder embodiment illustrated in FIG. 1 and further illustrating Detail G, which is a scale setting for imposing a pre-biasing force on the cone shaped deburring tool;

FIG. 12 is Detail G from FIG. 11, showing the numbered reference points for imposing a predetermined bias force on the deburring tool;

FIG. 13 is Detail J from FIG. 14;

FIG. 14 is a front elevation cross-sectional view of the embodiment of the invention illustrated in FIG. 11;

FIG. 15 is a front elevation view of the embodiment of the invention illustrated in FIG. 11 and wherein the spring force is adjusted to setting 5, which imposes a higher pre-biasing force on the deburring tool;

FIG. 16 is Detail H from FIG. 15;

FIG. 17 is Detail K from FIG. 18;

FIG. 18 is a front elevation cross-sectional view of the embodiment of the invention illustrated in FIG. 15;

DETAILED DESCRIPTION OF THE PREFERRED EMBODIMENTS

Figure 22:
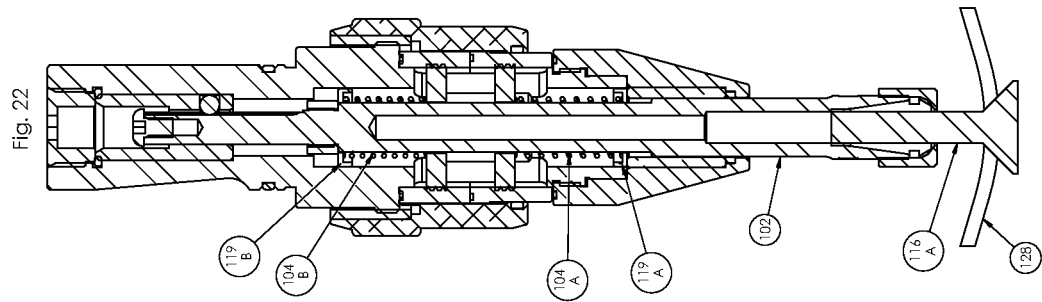
FIG. 22 is a front elevation cross-sectional view of the embodiment of this invention (similar to FIG. 9) illustrated in FIG. 21, and wherein the burr is imposing an upward force on the bottom side of the workpiece.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

It should be noted by those of ordinary skill in the art that while a conical and an inverted conical shaped deburring tool are shown and illustrated in the examples of embodiments of this invention, this invention is not so limited. Other shaped deburring tools known in the industry may also be used, which may include spherical shapes, oval shapes, combinations of conical and inverted conical shapes, as well as any other shapes and configurations that would provide a desired deburring surface to be imposed on the top or bottom side of a workpiece 128.

FIG. 1 is a front elevation view of an example of one embodiment of a deburring tool holder contemplated by this invention, illustrating a conical shaped deburring tool 116 configured to impose a deburring force on the top and/or side of a workpiece and is shown prior to making contact with a workpiece 128. FIG. 1 shows the tool holder with a cone shaped deburring tool 116, prior to making contact with the workpiece 128.

FIG. 2 is a front elevation view of the embodiment of the invention illustrated in FIG. 1, only wherein the deburring tool is in contact with the workpiece 128, illustrating the relative disposition of the deburring tool 116 within the deburring tool holder under compression while imposing a downward force on the top side of the workpiece 128. FIG. 2 shows the tool holder with the deburring tool 116 running along the top edge of the contoured workpiece 128. It can be seen that the spindle 102 is compressed as the deburring tool works the top portion of the workpiece 128.

FIG. 3 is a front elevation cross-sectional view of the embodiment of the deburring tool holder invention illustrated in FIG. 1, and wherein the deburring tool has not yet made contact with a workpiece (in a similar position or state to that shown in FIG. 1).

FIG. 3 illustrates compression spring 104A, compression spring washer 119A, tension spring 104B, tension spring washer 119B, clamping nut 105, and the collet 117 for gripping or holding the deburring tool 116. In FIG. 3 the deburring tool 116 is not in contact with the workpiece 128 so compression spring 104A is pushing its washer 119A against the shoulder of the spindle 102, even with the shoulder of the spindle inside the nose cone 106.

FIG. 4 is a front elevation cross-sectional view of the embodiment of the deburring tool holder invention illustrated in FIG. 2, and wherein the deburring tool is in contact with and imposing a downward force on the workpiece 128. FIG. 4 shows the deburring tool 116 in contact with the workpiece 128 and this is compressing the spindle 102. The shoulder of the spindle 102 is pushing up against the washer 119A and compression spring 104A, which in turn applies pressure on the deburring tool 116 against the workpiece 128. It will be noted by those of ordinary skill in the art that the tension spring 104B and tension spring washer 119B are still in the same position and have no influence on the spindle 102 when it is being compressed.

FIG. 5 is a front perspective view of the embodiment of the invention illustrated in FIGS. 1-4, and showing a position of the deburring tool 116 wherein it is in contact with the workpiece 128.

FIG. 6 is a front elevation view of the example of the embodiment of the invention illustrated in FIG. 1, only wherein the deburring tool is an inverted cone shaped and configured to deburr the underside of a workpiece 128, though contact is not shown in this figure.

FIG. 7 is a front elevation view of the embodiment of the invention illustrated in FIG. 6 and wherein the inverted cone shaped burr 116A is engaged with the underside of the workpiece 128 as the deburring tool 116A running along the bottom edge of the contoured workpiece 128. It can be seen that the spindle 102 is extended as the deburring tool 116A follows along the edge of the part or workpiece 128.

FIG. 8 is a cross-sectional view of the tool holder as shown in FIG. 6, illustrating compression spring 104A, compression spring washer 119A, tension spring 104B, tension spring washer 119B and spindle ring 120 which is fixed to the spindle 102. In FIG. 8 the deburring tool 116A is not in contact with the workpiece 128 so tension spring 104B is pushing its tension spring washer 119B against the spindle ring 120 even with the shoulder at the top of the bore of the housing 101.

FIG. 9 is a front elevation cross-sectional view of the deburring tool holder embodiment of the invention illustrated in FIG. 7, wherein the inverted cone shaped deburring tool 116A is engaged with the workpiece 128, imposing an upward force on the lower or underside of the workpiece 128. This extends the spindle 102 out of the housing. The spindle ring 120 is fixed to the spindle 102 and it is pulling down against the tension spring washer 119B and tension spring 104B which applies pressure on the deburring tool 116A against the bottom edge of the workpiece 128. Please note that the compression spring 104A and compression spring washer 119A are still in the same position and have no influence on the spindle 102 when it is being extended.

FIG. 10 is a front perspective view of the embodiment of the deburring tool holder invention illustrated in FIGS. 6-9, wherein the inverted cone shaped deburring tool 116A is engaged on the underside of the workpiece 128.

FIG. 11 is a front elevation view of the deburring tool holder embodiment illustrated in FIG. 1 and FIG. 12 is Detail G from FIG. 11, showing a scaled setting with numbered reference points for imposing a predetermined bias force on the deburring tool. The scale position in FIG. 12 is shown set at 0. FIG. 11 shows the deburring tool holder and its reference scale at setting 0 as indicated by the position of the ident sleeve 111 relative to the scale on the housing 101.

FIG. 13 is Detail J from the cross-sectional view shown in FIG. 14 (which is a section view of FIG. 11). In FIG. 13 the tension spring 104B and compression spring 104A are both at their maximum installed lengths and these lengths shown in FIG. 13 are equal (although those of ordinary skill in the art will understand the two are independent and do not need to be equal).

The adjustment traveler 118 shown in FIG. 13 has a left-hand thread on its outer faces, and the adjustment sleeve 108 also has an internal left-handed thread engaged with adjustment traveler 118. The outer ends of adjustment traveler 118 are captivated in window channels 101A (shown in FIG. 24) in the housing 101 so that the adjustment traveler 118 is prevented from rotating inside the housing 101, but it is free to travel upward or downward inside the window channels 101A as adjustment sleeve 108 is rotated. Likewise, the adjustment traveler (right hand threaded) 103 has a right-handed thread on its outer faces and the adjustment sleeve 124 also has an internal right-handed thread engaged with adjustment traveler (right hand threaded) 103.

The outer ends of the adjustment traveler (right hand threaded) 103 are also captivated in the window apertures or window channels 101A of the housing 101, so that the adjustment traveler (right hand threaded) 103 is prevented from rotating inside the housing 101, but it is free to travel downwards inside the window apertures or window channels 101A as adjustment 124 is turned. Both adjustment sleeves 108 and 124 have an external octagonal shape, and ident sleeve 111 has an internal octagon shape so that when ident sleeve 111 is turned it turns both adjustment sleeve 108 and 124 simultaneously. Ident sleeve 111 is also pressed over the threaded sleeve 126 which has internal threads engaged with the external threads on the housing 101. As ident sleeve 111 with threaded sleeve 126 are turned, the ident sleeve 111 will also turn adjustment sleeves 108 and 124 causing travelers 118 and 103 to separate. The threads of sleeve 126 and housing 101 will also cause the ident sleeve 111 to move upwards relative to the housing and this changes the reading for the reference scale. It will be appreciated by those of ordinary skill in the art that while the internal shape within the ident sleeve 111 is shown and described as an octagonal shape it is not so limited, but can preferably be any one of a number of other non-circular shapes and/or configurations.

FIG. 14 is a front elevation cross-sectional view of the embodiment of the invention illustrated in FIG. 11.

FIG. 15 is a front elevation view of the embodiment of the deburring tool holder invention illustrated in FIG. 11 and wherein the spring force is adjusted to setting 5, which imposes a higher pre-biasing force on the deburring tool. It should be noted that the compression spring 104A and tension spring 104B work independently of one another which means that an adjustment of the space for the springs and of the biasing force, results in a true increase or decrease of force in both the compression and tensions directions.

FIG. 16 is Detail H from FIG. 15, and shows detail of the scale from FIG. 15.

FIG. 17 is Detail K from FIG. 18 and shows a detail of cross-sectional view 18 which is a section view of FIG. 15. In FIG. 17 it can be seen that the adjustment travelers 118 and 103 are now separated from each other reducing the installed height for springs 104A and 104B and increasing the pre-load force or bias they exert against movement of the spindle 102 in the compression and tension directions respectively. Please note the space for compression spring 104A and tension spring 104B are equal so that the deburring tool holder will exert similar pressure against the workpiece in both the compression or tension (or extension) direction, for working on a top edge or bottom edge of a workpiece 128.

FIG. 17 shows a distance between adjustment travelers 118 and 103 at a higher present bias force as compared to FIG. 13 which shows the adjustment travelers 118 and 103 abutted against one another (on a base setting of "0" on the scale). It should be noted that making an adjustment to the biasing force in this invention does not change the overall length of the tool holder as can be seen from FIG. 11 in comparison to FIG. 15. This is because the position of spindle 102 always remains in the same neutral position when the deburring tool 116 is not engaged with a workpiece.

FIG. 18 is a front elevation cross-sectional view of the embodiment of the invention illustrated in FIG. 15, and illustrates compression spring 104A and tension spring 104B.

Figure 19:
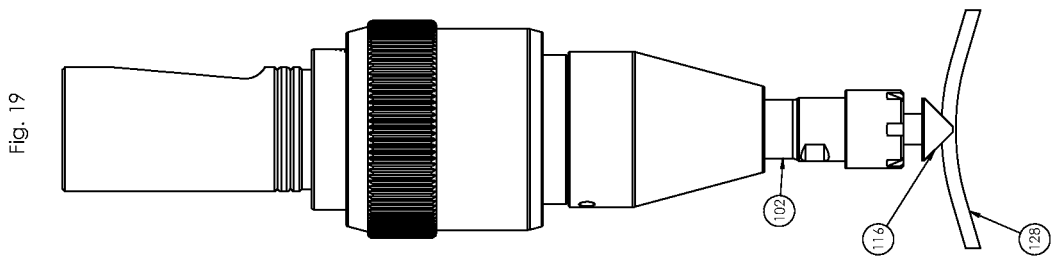
FIG. 19 is a front elevational view of a deburring tool holder embodiment of this invention (similar to FIG. 2) wherein the tool holder is at a higher adjustment setting, namely a number 5 setting and the deburring tool is compressing the spindle as it is forced upon the workpiece.

FIG. 19 is a front elevational view of a deburring tool holder embodiment of this invention (similar to FIG. 2) wherein the tool holder is set at a higher predetermined adjustment setting, namely a number 5 setting, and the deburring tool is compressing the spindle 102 as it is forced upon the workpiece 128.

Figure 20:
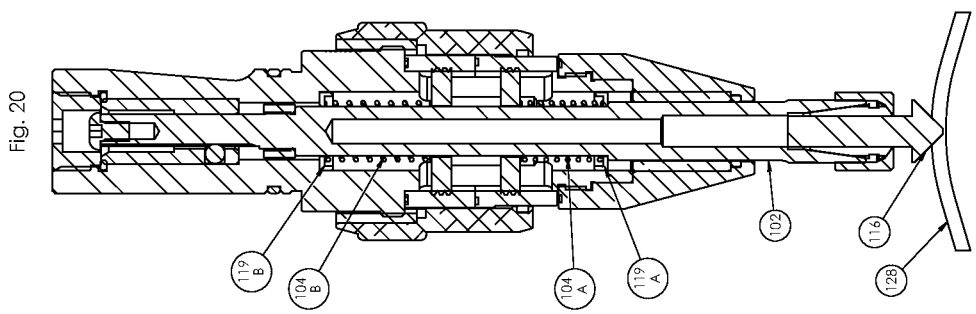
FIG. 20 is a front elevation cross-sectional view of the embodiment of this invention (similar to FIG. 4) illustrated in FIG. 19, and wherein the burr is being forced onto the workpiece, thereby compressing the spindle.

FIG. 20 is a front elevation cross-sectional view of the embodiment of this invention (similar to FIG. 4) illustrated in FIG. 19, and wherein the deburring tool 116 is being forced onto the workpiece 128, thereby compressing the spindle 102.

FIG. 19 and FIG. 20 are similar to FIG. 2 and FIG. 4 but with the tool holder at adjustment setting 5 as shown in FIGS. 15-18. The deburring tool 116 is running along the top edge of workpiece 128 compressing the spindle 102.

Figure 21:
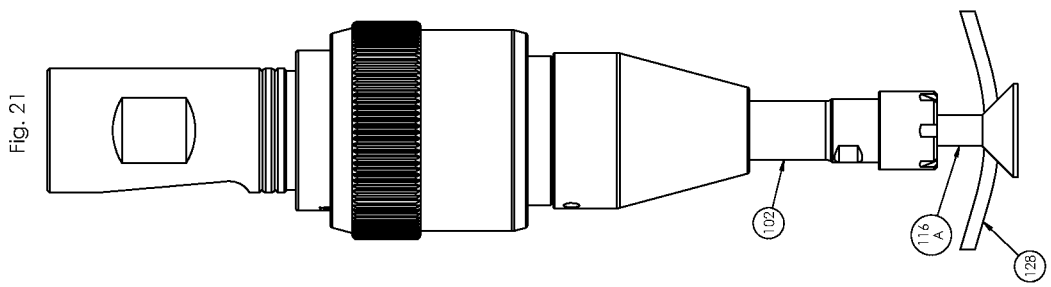
FIG. 21 is a front elevational view of a deburring tool holder embodiment of this invention (similar to FIG. 7) and the deburring tool is an inverted cone and is imposing an upward force on the bottom side of the workpiece.

FIG. 21 is a front elevational view of a deburring tool holder embodiment of this invention (similar to FIG. 7) and the deburring tool 116A is an inverted cone and is imposing an upward force on the bottom side of the workpiece 128.

FIG. 22 is a front elevation cross-sectional view of the embodiment of this invention (similar to FIG. 9) illustrated in FIG. 21, and wherein the deburring tool 116A is imposing an upward force on the bottom side of the workpiece 128.

FIG. 21 and FIG. 22 are similar to FIG. 7 and FIG. 9 but with the tool holder at adjustment setting 5 as shown in FIGS. 15-18. The deburring tool 116A is running along the bottom edge of workpiece 128 and is shown to be extending the spindle 102.

Figure 23:
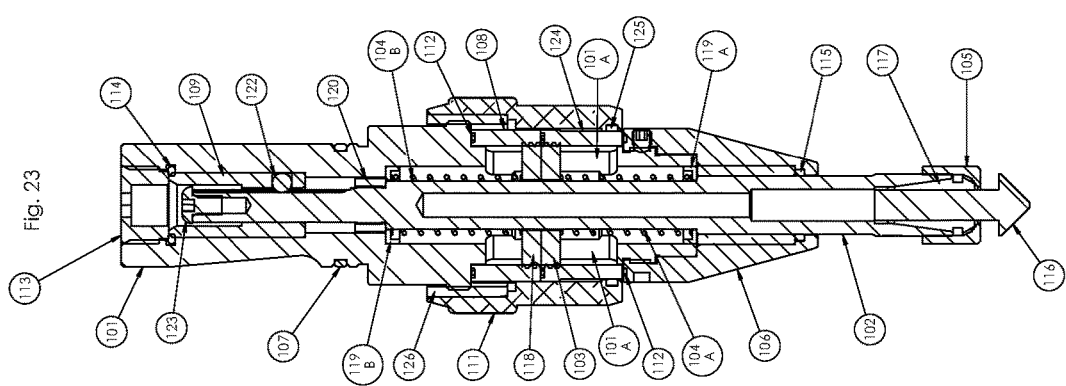
FIG. 23 is a front elevation cross-sectional view of the embodiment of the invention illustrated in FIGS. 1-22.

FIG. 23 is a front elevation cross-sectional view of the embodiment of the invention illustrated in FIGS. 1-22, illustrating and/or identifying most of the parts and pieces or components of the invention. FIG. 23 illustrates housing 101, spindle 102, adjustment traveler with a right hand thread 103, return or tension spring 104B, compression spring 104A, tension spring washer 119B, compression spring washer 119A, threaded fastener component 105 (a mini nut), nose cone 106, mounting O-ring 107, adjustment sleeve 108, driver 109, adjustment sleeve 111, O-ring 112, shank 113, O-ring 114, O-ring 115, deburring tool 116 (conical in this example), collet 117, adjustment traveler with left hand thread 118, spindle ring 120, ball 122, grease hole screw 123, adjustment sleeve 124, O-ring 125 and threaded sleeve 126.

FIG. 23 further shows how ident sleeve 111, when rotated rotates adjustment sleeves 108 and 124, which each have internal threads therein. The internal threads on the adjustment sleeves 108 and 124 engage with external threads on both adjustment travelers, i.e. adjustment traveler with left hand thread 118 and with adjustment traveler with a right hand thread 103, causing both adjustment travelers 118 and 103 (with adjustment traveler 103 abutting compression spring 104A and adjustment traveler 118 abutting tension spring 104B) to move away or toward one another. This adjusts the amount of bias force that is imparted by both the compression spring 104A and the tension spring 104B.

Figure 24:
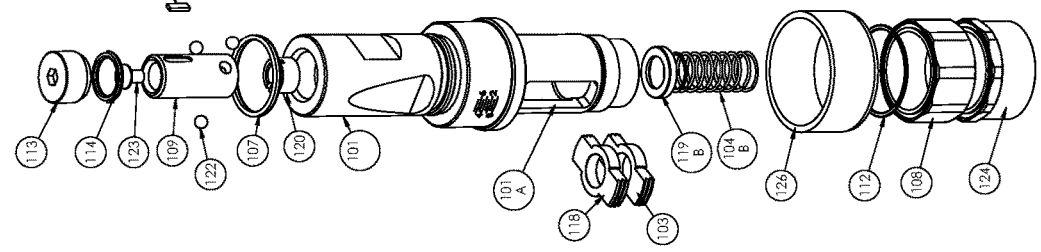
FIG. 24 is a front perspective exploded view of the embodiment of the invention illustrated in FIGS. 1-23.

FIG. 24 is a front perspective exploded view of the complete tool holder embodiment of the invention illustrated in FIGS. 1-23, also illustrating housing 101, spindle 102, adjustment traveler with a right hand thread 103, return spring 104 which includes tension spring 104B, compression spring 104A, tension spring washer 119B, compression spring washer 119A, threaded fastener component 105 (a mini nut), nose cone 106, mounting O-ring 107, adjustment sleeve 108, driver 109, key 110, adjustment sleeve 111, O-ring 112, shank 113, O-ring 114, O-ring 115, deburring tool 116 (conical in this example), collet 117, adjustment traveler with left hand thread 118, spindle ring 120, balls 122, grease holes screw 123, adjustment sleeve 124, O-ring 125 and threaded sleeve 126.

FIG. 24 also shows how the outer ends of adjustment traveler 118 are captivated in a window channel 101A (shown in FIG. 24) in the housing 101 so that the adjustment traveler 118 is prevented from rotating inside the housing 101, but it is free to travel upward or downward inside the window channel as adjustment sleeve 108 is rotated. Likewise, the adjustment traveler (right hand threaded) 103 has a right-handed thread on its outer faces and the adjustment sleeve 124 also has an internal right-handed thread engaged with adjustment traveler (right hand threaded) 103.

FIGS. 23 and 24 also show that driver 109 is fixed to the housing 101 by means of key 110. Drive balls 122 are retained in holes in driver 109 and protrude into slots 102A of spindle 102 for the purpose of transmitting rotational drive from the housing 101 to the spindle 102. The longitudinal slots 102A allow the free movement of the spindle 102 in the compression and tension direction.

FIG. 24 further shows multiple balls 122 which provides rotational drive, spindle ring 120 providing a shoulder for tension spring washer 119B. Spindle 102 slides into the spindle apertures in adjustment travelers 103 and 118. FIG. 24 also shows how the outer ends of adjustment traveler 118 are captivated in window channels 101A (shown in FIG. 24) in the housing 101 so that the adjustment traveler 118 is prevented from rotating inside the housing 101, but it is free to travel upward or downward inside the window channel as adjustment sleeve 108 is rotated. Likewise, the adjustment traveler (right hand threaded) 103 has a right-handed thread on its outer faces and the adjustment sleeve 124 also has an internal right-handed thread engaged with adjustment traveler (right hand threaded) 103

Figure 25:
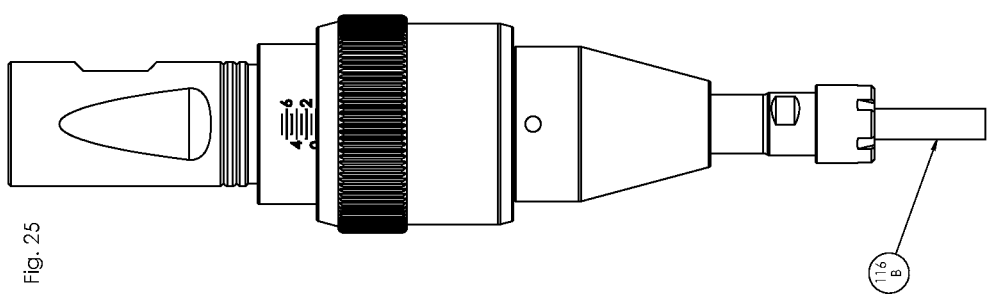
FIG. 25 is a front elevation view of an embodiment of this invention with a representative work tool 116B held by the tool holder.

FIG. 25 shows the deburring tool holder similar to FIG. 1 but with an alternate cutting tool as a way to illustrate that other types of cutting tools other than those for deburring can also be used with the invention for other applications such as engraving or tapping.

As will be appreciated by those of reasonable skill in the art, there are numerous embodiments to this invention, and variations of elements and components which may be used, all within the scope of this invention. In one embodiment for example, a deburring tool holder for use with a computer controlled machine with a rotating spindle, comprising: a housing with a top end, a lower end and an inner cavity: a top end of the tool holder being configured to either be held directly in a rotating spindle of a machine, a collet holder, or in a shrink fit tool holder held in the spindle of a machine; a spindle mounted and rotationally fixed within and relative to the housing inner cavity, with a spindle inner cavity, the spindle being positioned within the housing inner cavity for bilateral axial movement within the inner cavity, a top end of the spindle operatively attached to the top end of the housing and a lower end of the spindle is operably attached directly or indirectly to the deburring tool; a compression spring mounted within and to the housing inner cavity, and disposed to impose biasing force downward on the spindle and indirectly on the deburring tool; and a tension spring mounted within and to the housing inner cavity, and disposed to impose biasing force upward on the spindle; and further wherein the compression spring and the tension spring are configured to work independently of one another.

In addition to the embodiment disclosed in the preceding paragraph, the invention may further include: further wherein the compression spring is disposed to impart an adjustable predetermined bias force downward on the deburring tool and thereby placing the tool holder in compression; further wherein the tension spring is disposed to impart an adjustable predetermined bias force upward on the deburring tool and thereby placing the tool holder in tension and/or further wherein the tension spring is disposed to impart an adjustable predetermined bias force upward on the deburring tool and thereby placing the tool holder in tension.

Further embodiments may include a deburring tool holder comprising: a housing with a top end, a lower end and an inner cavity: a top end of the tool holder being configured to either be held directly in a rotating spindle or in a collet or endmill tool holder that is held in a rotating spindle of a machine; a spindle mounted and rotationally fixed within and relative to the housing inner cavity, with a spindle inner cavity, the spindle being positioned within the housing inner cavity for bilateral axial movement within the housing inner cavity, a top end of the spindle operatively attached to the top end of the housing and a lower end of the spindle is operably attached directly or indirectly to the deburring tool;

a compression spring mounted within and to the housing inner cavity, and disposed to impose biasing force downward on the spindle and indirectly on the deburring tool; and a tension spring mounted within and to the housing inner cavity, and disposed to impose biasing force upward on the spindle.

In addition to the embodiment disclosed in the preceding paragraph, the invention may further include: wherein the top end of the tool holder is the housing; and further comprising: a first adjustment traveler and a second adjustment traveler, each positioned within the housing interior cavity and rotationally fixed relative to the housing, the first adjustment traveler and the second adjustment traveler each including external threads and each disposed to rotate with the housing; a tension spring mounted within and to the housing inner cavity above and abutting the second adjustment traveler, and disposed to impose biasing force upward on the spindle; a compression spring mounted within and to the housing inner cavity above and abutting the first adjustment traveler, and disposed to impose downward force on the spindle; and one or more internally threaded adjustment sleeve mounted around the housing and operably configured to engage the external threads on the first adjustment traveler and the second adjustment traveler such that when the one or more adjustment sleeves are rotated the second adjustment traveler is moved axially thereby adjusting the bias force imparted on the tension spring and the first adjustment traveler is moved axially thereby adjusting the bias force imparted on the compression spring, thereby adjusting the bias force imposed on the deburring tool.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A deburring tool holder for use with a computer controlled machine with a rotating spindle, comprising:
    a housing with a top end, a lower end and an inner cavity:
    a top end of the tool holder being configured to either be held directly in a rotating spindle of a machine, a collet holder, or in a shrink fit tool holder held in the spindle of a machine;
    a spindle mounted and rotationally fixed within and relative to the housing inner cavity, with a spindle inner cavity, the spindle being positioned within the housing inner cavity for bilateral axial movement within the inner cavity, a top end of the spindle operatively attached to the top end of the housing and a lower end of the spindle is operably attached directly or indirectly to a deburring tool;
    a compression spring mounted within and to the housing inner cavity, and disposed to impose biasing force downward on the spindle and indirectly on the deburring tool;
    a tension spring mounted within and to the housing inner cavity, and disposed to impose biasing force upward on the spindle;
    a first adjustment traveler and a second adjustment traveler, each positioned within the housing interior cavity and rotationally fixed relative to the housing, the first adjustment traveler and the second adjustment traveler each including external threads and each disposed to rotate with the housing;
    the tension spring mounted within and to the housing inner cavity above and abutting the second adjustment traveler, and disposed to impose biasing force upward on the spindle;
    the compression spring mounted within and to the housing inner cavity below and abutting the first adjustment traveler, and disposed to impose downward force on the spindle;
    one or more internal threads within the adjustment sleeve mounted around the housing and operably configured to engage the external threads on the first adjustment traveler and the second adjustment traveler such that when the one or more adjustment sleeves are rotated the second adjustment traveler is moved axially thereby adjusting the bias force imparted on the tension spring and the first adjustment traveler is moved axially thereby adjusting the bias force imparted on the compression spring, thereby adjusting the bias force imposed on the deburring tool; and
    further wherein the compression spring and the tension spring are configured to work independently of one another.

2. The deburring tool holder as recited in claim 1 and further wherein the compression spring is disposed to impart an adjustable predetermined bias force downward on the deburring tool and thereby placing the tool holder in compression.

3. The deburring tool holder as recited in claim 2 and further wherein the tension spring is disposed to impart an adjustable predetermined bias force upward on the deburring tool and thereby placing the tool holder in tension.

4. The deburring tool holder as recited in claim 1 and further wherein the tension spring is disposed to impart an adjustable predetermined bias force upward on the deburring tool and thereby placing the tool holder in tension.

5. A deburring tool holder comprising:
    a housing with a top end, a lower end and an inner cavity:
    a top end of the tool holder being configured to either be held directly in a rotating spindle or in a collet or endmill tool holder that is held in a rotating spindle of a machine;
    a spindle mounted and rotationally fixed within and relative to the housing inner cavity, with a spindle inner cavity, the spindle being positioned within the housing inner cavity for bilateral axial movement within the housing inner cavity, a top end of the spindle operatively attached to the top end of the housing and a lower end of the spindle is operably attached directly or indirectly to a deburring tool;
    a compression spring mounted within and to the housing inner cavity, and disposed to impose biasing force downward on the spindle and indirectly on the deburring tool;
    a tension spring mounted within and to the housing inner cavity, and disposed to impose biasing force upward on the spindle;
    a first adjustment traveler and a second adjustment traveler, each positioned within the housing interior cavity and rotationally fixed relative to the housing, the first adjustment traveler and the second adjustment traveler each including external threads and each disposed to rotate with the housing;

the tension spring mounted within and to the housing inner cavity above and abutting the second adjustment traveler, and disposed to impose biasing force upward on the spindle;

the compression spring mounted within and to the housing inner cavity below and abutting the first adjustment traveler, and disposed to impose downward force on the spindle; and one or more internal threads within the adjustment sleeve mounted around the housing and operably configured to engage the external threads on the first adjustment traveler and the second adjustment traveler such that when the one or more adjustment sleeves are rotated the second adjustment traveler is moved axially thereby adjusting the bias force imparted on the tension spring and the first adjustment traveler is moved axially thereby adjusting the bias force imparted on the compression spring, thereby adjusting the bias force imposed on the deburring tool.

6. The deburring tool holder as recited in claim 5, and wherein the top end of the tool holder is the housing.

* * * * *